(12) United States Patent
Zheldak

(10) Patent No.: US 9,365,668 B2
(45) Date of Patent: Jun. 14, 2016

(54) WATERSOLUBLE LINEAR COPOLYMER

(75) Inventor: Liudmyla Dmytrivna Zheldak, Kyiv (UA)

(73) Assignee: BIOMATRIX INTERNATIONAL LIMITED, Nicosia (CY)

( * ) Notice: Subject to any disclaimer, the term of this patent is extended or adjusted under 35 U.S.C. 154(b) by 85 days.

(21) Appl. No.: 14/360,800

(22) PCT Filed: May 23, 2012

(86) PCT No.: PCT/UA2012/000052
§ 371 (c)(1),
(2), (4) Date: May 27, 2014

(87) PCT Pub. No.: WO2013/077831
PCT Pub. Date: May 30, 2013

(65) Prior Publication Data
US 2015/0038661 A1    Feb. 5, 2015

(30) Foreign Application Priority Data

Nov. 24, 2011  (UA) .................................. 201113857

(51) Int. Cl.
| | |
|---|---|
| *C08F 20/58* | (2006.01) |
| *C08F 20/00* | (2006.01) |
| *C08F 297/02* | (2006.01) |
| *C08G 61/04* | (2006.01) |
| *C08F 220/06* | (2006.01) |
| *C08F 2/10* | (2006.01) |
| *C08F 220/56* | (2006.01) |
| *C08F 222/38* | (2006.01) |
| *C08F 226/02* | (2006.01) |

(52) U.S. Cl.
CPC ................. *C08F 220/06* (2013.01); *C08F 2/10* (2013.01); *C08F 220/56* (2013.01); *C08F 222/385* (2013.01); *C08F 226/02* (2013.01)

(58) Field of Classification Search
CPC ........ C08F 220/06; C08F 2/10; C08F 226/02; C08F 220/56; C08F 222/385
USPC ..................... 526/304, 303.1, 72, 306; 520/1; 524/29.1; 525/242; 528/480
See application file for complete search history.

(56) References Cited

FOREIGN PATENT DOCUMENTS

EP    0037138    * 10/1981

OTHER PUBLICATIONS

Gottfried, EP 0037138 Machine Translation, Oct. 7, 1981.*

* cited by examiner

*Primary Examiner* — Ling Choi
*Assistant Examiner* — Jessica E Whiteley
(74) *Attorney, Agent, or Firm* — Abelman, Frayne & Schwab

(57) ABSTRACT

The invention concerns the water-soluble linear heterochain dipolymer having the general formula:

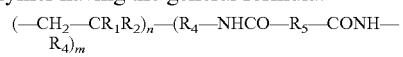

where
$R_1$—can be atom of hydrogen or alkyl $CH_3$,
$R_2$—can be COOH, $CONH_2$, $COOCH_3$ depending on the kind of vinyl monomer,
$R_3$—is atom of hydrogen or OH group, depending on the kind of divinyl monomer,
$R_4$—can be ($CH_2$-$CHR_3$) or ($CH_2$-$CHR_3$-$CH_2$),
$R_5$—can be ($CH_2$) or ($CH(OH)$)$_2$, depending on the kind of divinyl monomer.
m and n-interrelationships between the vinyl and divinyl monomers,
herewith the correlation m/n is within 10 to 100,
herewith the sections of the chain in which amide groups —CO—NH— are present, are connected with the similar sections through the H-linkages between the amide and carboxyl groups.
Such a substance belongs to polymers of a new structure with different physical-chemical properties. The amide portion of the molecule is unique according to its structural properties and according to peculiar intermolecular interactions. Due to the hybridization of nitrogen, carbon and hydrogen atoms in the amine group, this section is almost flat. What is also important is that the hydrogen, connected with the nitrogen atom and oxygen atom in carbon groups are all able to create a strong hydrogen linkage.
Besides in the mentioned substance, the cross-cross-linked net of polymer is not possible to create. Therefore the macromolecule of the substance is a hydrophilic 3D atrix which arises on the account of H-linkages between the amide and carboxyl groups of polyamide, which keeps the water environment.

3 Claims, 1 Drawing Sheet

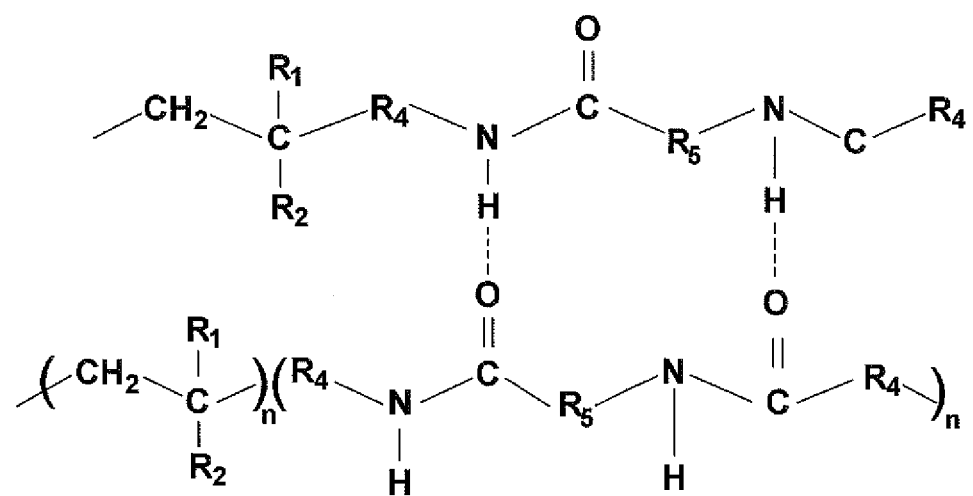

WATERSOLUBLE LINEAR COPOLYMER

This application is a National Phase of PCT/UA2012/1000052, filed 23 May 2012, which claims priority from Ukrainian Application No. UA2011 13857, filed 24Nov. 2011, the specifications of which are all incorporated herein by reference.

The invention relates to the chemistry of high molecular substances more specifically to the synthetic high molecular substances the chain of which can be a hydrophilic 3D matrix arising due to H-linkages that emerge between the amide and carboxylic groups of polyamides and provide the possibility to maintain the water environment.

In the variety of polymer systems one can distinguish net-like or cross-linked polymers, the chains of which are connected by covalent bonds with the creation of the single space structure—polymer net. The characteristic properties of net-like polymers are the absence of viscous-flow state and little solubility in any solvent. Netlike polymers swollen in solvent are called gels.

But the unique properties of the polymer group that provide the possibility to keep water environment and unusual sensibility to external conditions (pH, solvent content, temperature) attract the interest of the researchers. The creation of membranes by controlled penetration, carriers of treatment preparations and their direct transport, new fillers, work with the new types of robots, plant growing in new nutritional solutions—all these are possible due to the unique properties of such substances.

Quite a lot of substances on the basis of cross-linked polyacrylamide have been developed and are used currently. They are based usually from the following elements: acrylamide and methiline-bis-acrylamide in which the linear chains of polyacrylamide as carbochain homopolymer are connected methiline-bis-acrylamide by the strong covalent bonds. In other words cross-linked by the methiline-bis-acrylamide with the creation of a 3D net, the centers of which contain water. These are the chemically stable substances with little solubility and small indexes of swelling under normal conditions.

Because of the peculiarities of their structure these substances have the steady character (as their 3D net is based on strong covalentbonds).

For example (RU2301814):

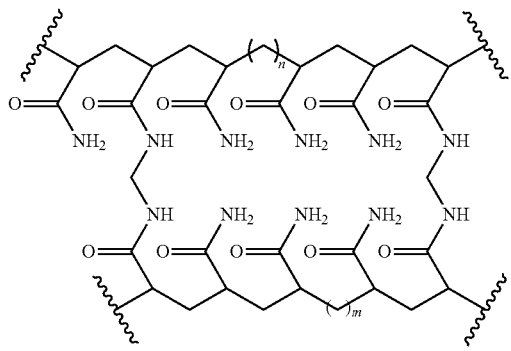

As a result one can come to the conclusion that the high cross-linking by the cross-linker of 3D net of homochain polyacrylamide, restricts the swelling and fluidity in the solvent and leads to such a negative property as thixotropy. As a result, these substances have the following properties: they swell only during 80-100 hours at high temperatures (for example RU2301814), which points out the cross-cross-linked polyacrylamide with branched structure.

These properties of polymers are solubility, ability to have thick flow, stability and high sensibility to the creation of covalent chemical bonds between the macromolecules (the so-called cross-linking).

Solubility of polymers and their chemical stability depend on the peculiarities of the structure, presence of branching, cross-linkages, length of macromolecule and other factors.

Cellulose is a known water-soluble cross-linked dipolymer. It has a three-dimensional structure, formed with the help of acrylamide or acrylamide and acrylate linked through the divinyl monomer that is used in the composition and has water and groups of salts (see. U.S. Pat. No. 4,051,086).

The upper borderline of the swelling of known water-soluble cross-linked dipolymers is restricted by low values, besides being strictly linked, and the three-dimensional structure restricts its fluidity. The copolymer is characterized by long-term chemical stability, which is undesirable in some practical cases.

A water-soluble cross-linked dipolymer which has a three-dimensional structure (see. JP6227328), formed on the basis of ammonium acrylate and linking agent, is also known.

The upper borderline of the swelling of known water-soluble cross-linked dipolymers is restricted by the low values, besides being strictly linked and the three dimensional structure restricts its fluidity. The copolymer is characterized by long term chemical stability, which is undesirable in some practical cases.

The aim of the development work is the creation of water-soluble linear heterochain dipolymers on account of low-energetic bonds of monomers that create it, which is a separate hydrophilic 3D matrix that maintains the water environment and gives it watersolubility, increases fluidity and reduces its chemical stability.

To fulfill this aim, water-soluble linear heterochain dipolymer has I formula:

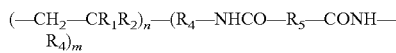

wherein, $R_1$— can be atom of hydrogen or alkyl $CH_3$, $R_2$— can be COOH, $CONH_2$, —$COOCH_3$ depending on the kind of vinyl monomer, $R_3$— is atom of hydrogen or OH group, depending on the kind of divinyl monomer, $R_4$— can be ($CH_2$—$CHR_3$) or ($CH_2$—$CHR_3$—$CH_2$), $R_5$— can be ($CH_2$) or ($CH(OH))_2$, depending on the kind of divinyl monomer.

m and n—interrelationships between the vinyl and divinyl monomers, herewith the correlation m/n is within 10 to 100, herewith the sections of the chain in which amide groups —CO—NH— are present, are connected with the similar sections through the H-linkages between the amide and carboxyl groups.

Such a substance belongs to polymers having a new structure that can be referred to as water-soluble dipolymers, which t can be obtained by way of copolymerization of vinyl monomers of group of ethylene carboxylic acid $CH_2$=CH—COOH or its derivatives (methyl-acrylic acid (2-methylpropene acid)

$CH_2$=$C(CH_3)$—COOH, or acrylamide ($CH_2$=CH—CO—$NH_2$), or methylmethacrylate ($CH_2$=$C(CH_3)$—$COOCH_3$, and divinyl monomers that have in their content amide groups (—CO—NH—) NN'-diallyltartardiamide (DATD). —$CH_2$=CH—$CH_2$—NH—CO—CH(OH)—CH (OH)—CO—NH—CH$_2$—CH═CH$_2$, BISAM (CH$_2$═CH—CO—NH—CH$_2$—CO—NH—CH═CH$_2$) into the linear dipolymer. After the copolymerization as a consequence of the main chain receiving the amide groups —CO—NH—, the homopolymer gets the structure of heteropolymer (polyamide) with different physical-chemical properties.

Polyamides are heterochain polymers, in which in the main chain of the macromolecule the amide groups —CO—NH— are present. Carbon-chain polymers with the side amide groups —CO—NH$_2$, for example polyacrylamide, do not belong to the polyamides.

The amide section of the molecule is unique, according to its structural properties and according to its peculiar intermolecular interactions. Due to the hybridization of nitrogen, carbon and hydrogen atoms in the amine group, this section is almost flat. What is also important is that the hydrogen, connected with the nitrogen atom and oxygen atom in carbon groups, are all able to create the strong hydrogen linkage.

Besides in the mentioned substance, it is not possible to create the cross-linked net of polymer. Therefore, the macromolecule of the substance is a hydrophilic 3D matrix, which arises on account of H-linkages between the amide and carboxyl groups of polyamide, which maintains the water environment.

H-linkages are approximately 20 times less strong than covalent linkages. Unlike the usual chemical linkages, H-linkage arises not as a result of single-stage synthesis using the radical linking agent, but is created under the corresponding artificial circumstances.

The distinctive feature of the H-linkages is comparatively low strength, its energy is almost one order less than the energy of covalent chemical linkage, for example.

These exact linkages provide the large swelling and water solubility of the mentioned substance.

In some variants of realization of water-soluble linear heterochain dipolymers the vinyl monomers are selected from the group consisting of ethylene carboxylic acid, CH$_2$═CH—COOH, and its derivatives, methacrylic acid (2-methylpropene acid) CH$_2$═C(CH$_3$)—COOH, or acrylamide (CH$_2$═CH—CO—NH$_2$), or methylmethacrylate (CH$_2$═C(CH$_3$)—COOCH$_3$.

The usage of the mentioned peculiarities in dipolymers additionally increases the swelling of the target substance.

In some variants of realization of water-soluble linear heterochain dipolymers the vinyl monomers are selected from the group consisting of NN'-diallyltartardiamide (DATD) —CH$_2$═CH—CH$_2$—NH—CO—CH(OH)—CH(OH)—CO—NH—CH$_2$—CH═CH$_2$, BISAM (CH$_2$═CH—CO—NH—CH$_2$—CO—NH—CH═CH$_2$).

The usage of the mentioned peculiarities in dipolymers additionally increases the solubility of the target substance.

The water-soluble linear heterochain dipolymer is illustrated by the examples. In FIG. 1 the structure of the water-soluble linear heterochain dipolymer with the mentioning of the H-linkages between the amide and carboxyl groups is graphically represented in general view.

The substances in the general view are achieved by a two-step polymerization in a water environment with the initiating agents of polymerization. The following substances can be used as the initiating agents of the first grade of polymerization:

Tetramethylethylenediamine (TEMED) C$_6$H$_{16}$N$_2$—(CH$_3$)$_2$N—CH$_2$—CH$_2$—N(CH$_3$)$_2$, Dimethylaminopropionitrile (DMAPN) C$_5$H$_{10}$N$_2$—(CH$_3$)$_2$N—CH$_2$—CH$_2$—CN, Ammonium persulphate (APS) (NH$_4$)$_2$S$_2$O$_8$, and 6,7-Dimethyl-9-(D-1-ribitil)-isoalloxazine (riboflavin) C$_{17}$H$_{20}$N$_4$O$_6$.

EXAMPLE 1

The target dipolymer on the basis of methyl-acrylic acid and BISAM is obtained through a two-step polymerization in a water environment with the initiating agents of polymerization.

The polymerization was performed according to the following scheme.

To obtain 100 ml of solution, which contains 5 weighable percent of polymethyl-acrylic acid, 5 ml of methyl-acrylic acid (MAA) were used and BISAM 0.09 g was taken as a divinyl monomer in an amount of approximately 1 part for 100 parts of polymethyl-acrylic acid. A water solution of ammonium persulphate (APS) (0.5 g) and a small quantity of dimethylaminopropionitrile (DMAPN) were added. The obtained solution was mixed and left to rest for 45 minutes. After that, primarily synthesized preproduct was taken out of the glass and comminuted.

The preproduct was scoured with distilled water, and then, the homogenization was performed mechanically (under the ultraviolet lamp) by adding drop-by-drop a water solution of riboflavin. In this way the second step of polymerization was performed.

EXAMPLE 2

The target dipolymer on the basis of methyl-acrylic acid and (DATD) was obtained through a two-step polymerization in a water environment with the initiating agents of polymerization.

To obtain 100 ml of solution, which contains 5 weighable percent of acrylic acid, 5 ml of acrylic acid (AA) were used, NN'-diallyltartardiamide (DATD) 0.065 g was taken as a divinyl monomer in an amount of parts for 80 parts of acrylic acid. A water solution of ammonium persulphate (APS) (0.5 g) and small quantity of dimethylaminopropionitrile (DMAPN) were added. The obtained solution was mixed and left to rest for 45 minutes at room temperature. After that, primarily synthesized preproduct was taken out of the bottle and comminuted.

The preproduct was scoured with distilled water, and then the homogenization was performed mechanically (under the ultraviolet lamp) by adding drop-by-drop a water solution of riboflavin. Under these circumstances the second step of polymerization was performed.

EXAMPLE 3

The target dipolymer on the basis of acrylamide and BISAM was obtained through a two-step polymerization in a water environment with the initiating agents of polymerization.

To obtain 100 ml of solution, which contains 4 weighable percent of acrylamide, 4 g of acrylamide (AA) were used, BISAM 0.080 g was taken as a divinyl monomer in an amount of 1 part for 50 parts of acrylamide. A water solution of ammonium persulphate (APS) (0.5 g) and a small quantity of dimethylaminopropionitrile (DMAPN) was added. The obtained solution was mixed and left to rest for 45 minutes. After that the primarily synthesized preproduct was taken out of the bottle and comminuted.

The preproduct was scoured with distilled water, and then the homogenization was performed mechanically (under the ultraviolet lamp) by adding drop-by-drop a water solution of riboflavin. Under these circumstances the second step of polymerization was performed.

The invention claimed is:

1. A water soluble linear heterochain dipolymer having the formula:

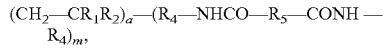

wherein $R_1$—can be an atom of hydrogen or alkyl $CH_3$, $R_2$—can be COOH, $CONH_2$, $COOCH_3$ depending on the kind of vinyl monomer, $R_3$—is an atom of hydrogen or an OH group, depending on the kind of divinyl monomer, $R_4$—can be ($CH_2$—$CHR_3$) or ($CH_2$—$CHR_3$—$CH_2$), $R_5$—can be ($CH_2$) or $(CH(OH))_2$, depending on the kind of divinyl monomer;

m and n— interrelationships between the vinyl and divinyl monomers, wherein the correlation min is within 10 to 100, and wherein the sections of the chain in which amide groups —CO—NH— are present, are connected with the similar sections through the H-linkages between the amide and carboxyl groups.

2. A water-soluble linear heterochain dipolymer according to claim 1 wherein, the vinyl monomers are selected from the group consisting of ethylene carboxylic acid $CH_2$=CH—COOH or its derivatives (methyl-acrylic acid (2-methylpropane acid) $CH_2$=$C(CH_3)$—COOH, or acrylamide ($CH_2$=CH—CO—$NH_2$), or methylmethacrylate ($CH_2$=$C(CH_3)$—$COOCH_3$.

3. A water-soluble linear heterochain dipolymer according to claim 1, wherein the vinyl monomers are selected from the group consisting of NN'-diallyltartardiamide (DATD) —CH2=CH—CH2—NH—CO—CH(OH)—CH(OH)—CO—NH—CH2—CH=CH2, and BISAM ($CH_2$=CH—CO—NH—CH2—CO—NH—CH=$CH_2$).

* * * * *